(12) United States Patent
Chang et al.

(10) Patent No.: US 9,238,554 B2
(45) Date of Patent: Jan. 19, 2016

(54) COMPUTING DEVICE AND METHOD OF PAIRING ACCESSORIES

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Chih-Kuang Chang, New Taipei (TW); Xin-Yuan Wu, Shenzhen (CN); Lu Yang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/519,993

(22) Filed: Oct. 21, 2014

(65) Prior Publication Data

US 2015/0148938 A1 May 28, 2015

(30) Foreign Application Priority Data

Nov. 26, 2013 (CN) .......................... 2013 1 0607973

(51) Int. Cl.
*G06F 7/00* (2006.01)
*B65G 43/00* (2006.01)
*B65G 1/137* (2006.01)
*G05B 15/02* (2006.01)

(52) U.S. Cl.
CPC .............. *B65G 43/00* (2013.01); *B65G 1/1373* (2013.01); *G05B 15/02* (2013.01)

(58) Field of Classification Search
None
See application file for complete search history.

(56) References Cited

U.S. PATENT DOCUMENTS 2,888,197 A * 5/1959 Winn ...................... A47F 10/02
186/55

* cited by examiner

*Primary Examiner* — Yolanda Cumbess
(74) *Attorney, Agent, or Firm* — Novak Druce Connolly Bove + Quigg LLP

(57) ABSTRACT

Method of pairing accessories includes obtaining coordinates of outline points of first accessories and second accessories of a product. The outline points of the first accessories and the second accessories are assigned numbers. Each of the first accessories and each of the second accessories are transported to a corresponding location according to the assigned numbers. A second accessory is determined to pair with each of the first accessories according to the coordinates of the outline points of the first accessories and the second accessories. Paired first and second accessories are transported from corresponding locations into a first box for assembly, and unpaired first and second accessories are transported into a second box by a transport system.

15 Claims, 8 Drawing Sheets

US 9,238,554 B2

COMPUTING DEVICE AND METHOD OF PAIRING ACCESSORIES

CROSS-REFERENCE TO RELATED APPLICATIONS

This application claims priority to Chinese Patent Application No. 201310607973.7 filed on Nov. 26, 2013 in the State Intellectual Property Office of the People's Republic of China, the contents of which are incorporated by reference herein.

FIELD

Embodiments of the present disclosure relate to data processing technology, and particularly to a computing device and a method of pairing accessories using the computing device.

BACKGROUND

A product may include one or more accessories. When a first accessory is assembled into a second accessory of the product, a gap between the first accessory and the second accessory is defined. A producer may want to make the gap smaller.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding accessories throughout the several views.

DETAILED DESCRIPTION

Figure 1:
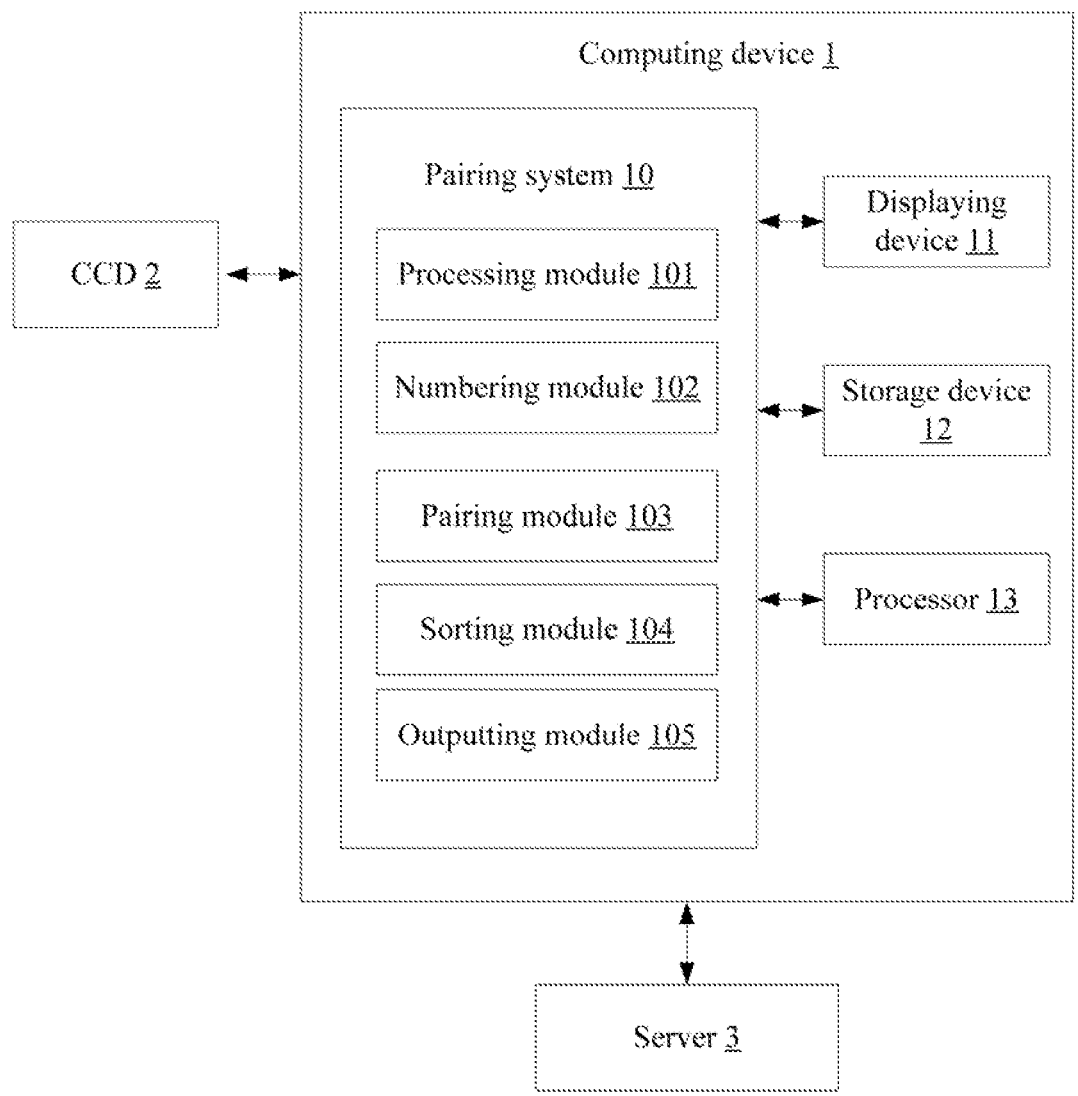
FIG. 1 illustrates a block diagram of one embodiment of a computing device.

It will be appreciated that for simplicity and clarity of illustration, where appropriate, reference numerals have been repeated among the different figures to indicate corresponding or analogous accessories. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain accessories may be exaggerated to better illustrate details and features. The description is not to be considered as limiting the scope of the embodiments described herein.

Several definitions that apply throughout this disclosure will now be presented. The term "module" refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY™, flash memory, and hard disk drives. The term "comprising" means "including, but not necessarily limited to"; it specifically indicates open-ended inclusion or membership in a so-described combination, group, series and the like.

Figure 2:
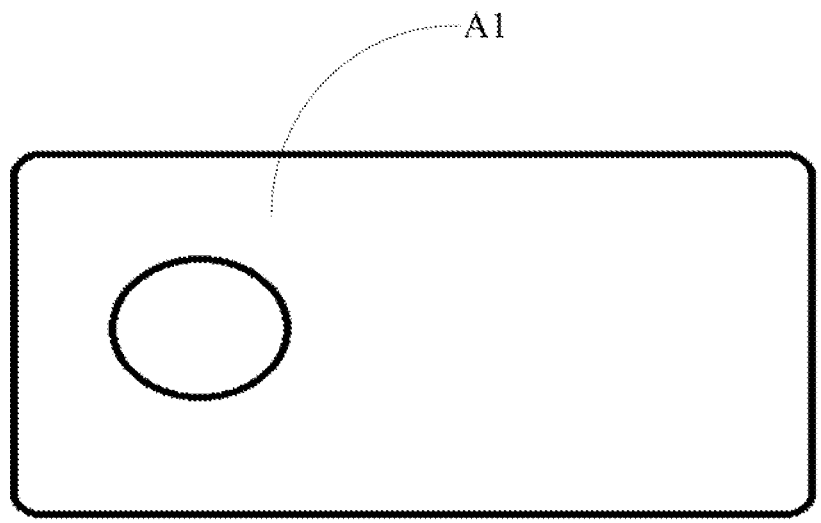
FIG. 2 illustrates a plan view of an example of a first accessory and a second accessory.
Figure 2:
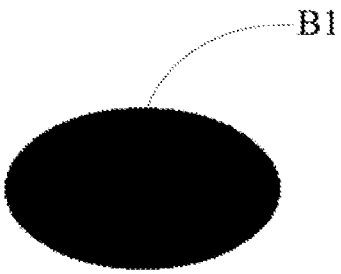
Figure 3:
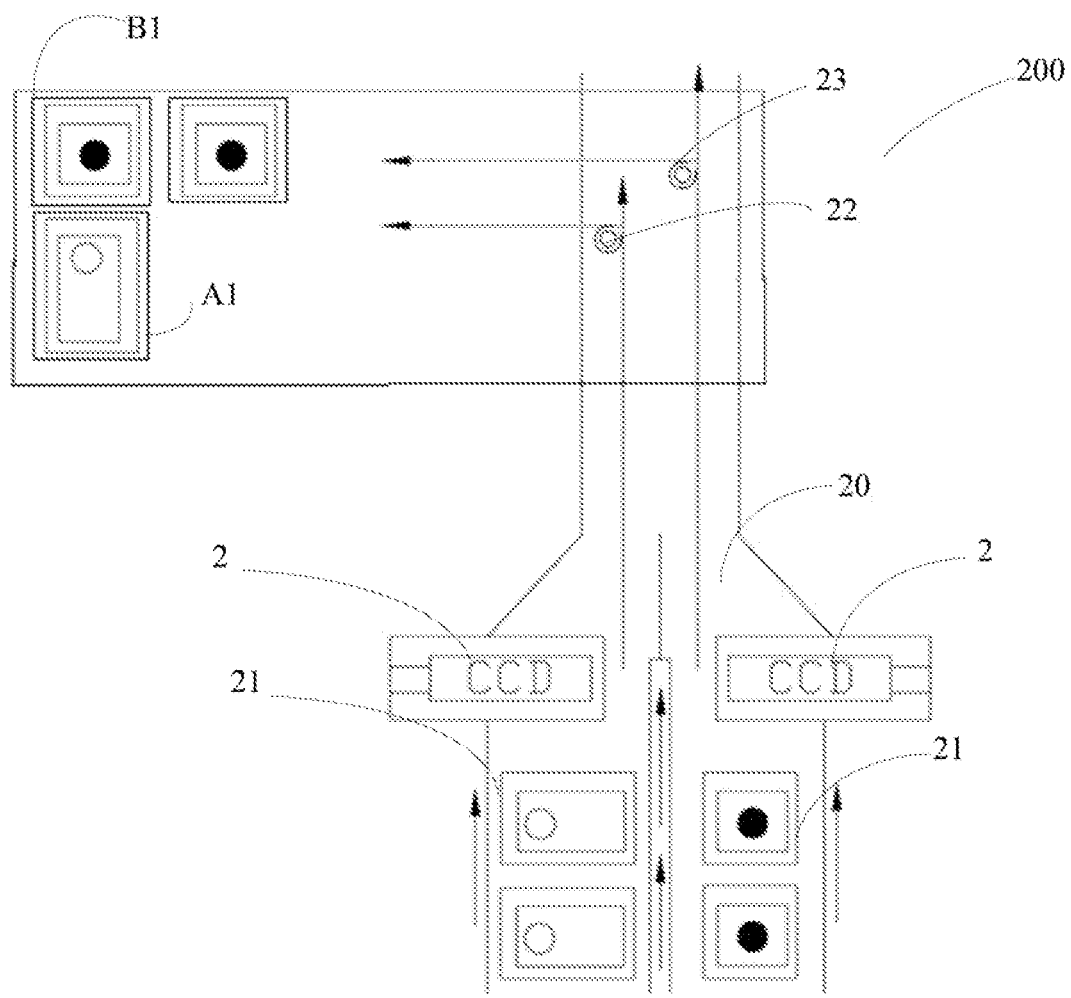
FIG. 3 shows a plurality of first accessories and second accessories transported by a transport system.

FIG. 1 illustrates a block diagram of one embodiment of a computing device. In the embodiment, a computing device 1 includes a pairing system 10, a display device 11, a storage device 12, and at least one processor 13. FIG. 2 and FIG. 3 illustrate the computing device 1 is connected to a transport system 200, a charge coupled device (CCD) 2, and a server 3.

In the embodiment, FIG. 3 illustrates that the transport system 200 includes a transport rail 20, and a plurality of steering wheels, such as steering wheels 22, 23 for example. The transport system 200 is used to transport a plurality of accessories, such as first accessories (e.g., A1) and second accessories (e.g., B1). A product is obtained by assembling the accessories, for example, one of the first accessories and one of the second accessories can be assembled together. The product may also include one or more other accessories as well as the first accessory and the second accessory.

In this embodiment, each of the first accessories and the second accessories can be fixed on a holder 21, and is kept parallel to a plane where the transport rail 20 is located. In this embodiment, the pairing system 10 controls the transport system 200 to transport the first accessories and the second accessories at a predetermined speed.

In this embodiment, when the first accessories and the second accessories pass through the position of the CCD 2, the CCD 2 scans outline points of each of the first accessories and the second accessories, and obtains three-dimensional coordinates of the outline points of each of the first accessories and the second accessories. In this embodiment, the CCD 2 further stores the obtained three-dimensional coordinates in the server 3. In other embodiments, the CCD 2 stores the obtained three-dimensional coordinates in the storage device 12.

The storage device 12 can be an internal storage device, such as a flash memory, a random access memory (RAM) for temporary storage of information, and/or a read-only memory (ROM) for permanent storage of information. The storage device 12 can also be an external storage device, such as an external hard disk, a storage card, or a data storage medium. The at least one processor 13 can be a central processing unit (CPU), a microprocessor, or other data processor chip that performs functions of the computing device 1.

In this embodiment, the pairing system 10 can automatically determine a second accessory for pairing with each of the first accessories. In this embodiment, the pairing system 10 includes a processing module 101, a numbering module 102, a pairing module 103, a sorting module 104, and an outputting module 105. Modules 101-105 can include computerized instructions in the form of one or more computer-readable programs that can be stored in a non-transitory computer-readable medium, for example the storage device 12, and executed by the at least one processor 13 to provide functions of the present disclosure.

The processing module 101 controls the transport system 200 to transport the first accessories and the second accessories at a predetermined speed. In at least one embodiment, each of the first accessories and the second accessories is respectively fixed in the holder 21, and is kept parallel to the plane where the transport rail 20 is located.

The processing module 101 obtains three-dimensional coordinates of outline points of each of the first accessories and the second accessories using the CCD 2, when each of the first accessories and the second accessories passes through the CCD 2.

Figure 5:
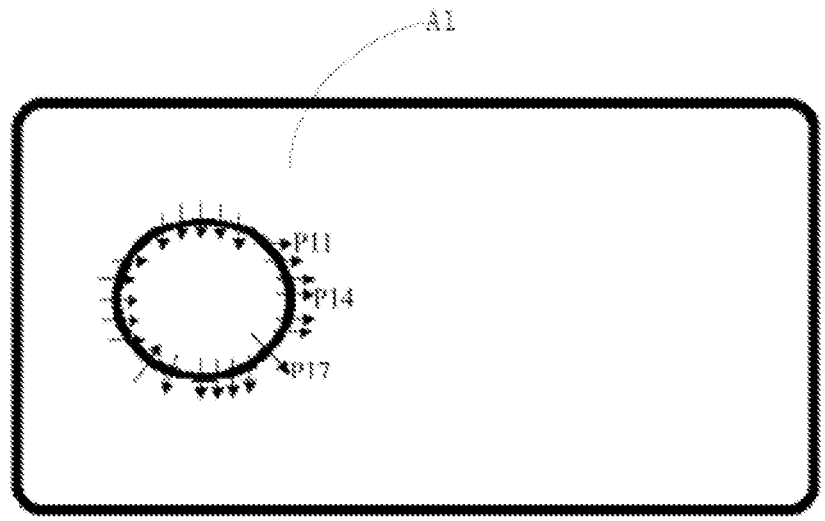
FIG. 5 shows an example of outline points of a first accessory and a second accessory.
Figure 5:
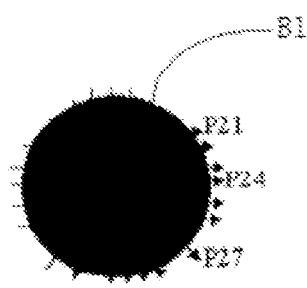

For example, FIG. 5 illustrates that the processing module 101 obtains three-dimensional coordinates P11, P14, P17 of outline points of a first accessory "A1", and obtains three-dimensional coordinates P21, P24, P27 of outline points of a second accessory "B1". Three three-dimensional coordinates are obtained to represent the first accessory "A1" and the second accessory "B1" in the FIG. 5. In other embodiments, a different number of three-dimensional coordinates can be obtained to represent the first accessory "A1" and the second accessory "B1".

The numbering module 102 assigns numbers to the outline points of the first accessories and the second accessories, and controls the transport system 200 to transport each of the first accessories and each of the second accessories to a corresponding location according to the numbers of the outline points of the first accessories and the second accessories. The three-dimensional coordinates of the outline points of the first accessory and the second accessories are stored in the server 3 by the numbering module 102 according to the number of outline points.

For example, the numbering module 102 assigns a number "A1" to the outline points of the first accessory "A1", and controls the steering wheel 22 to transport the first accessory "A1" into a cabinet whose number is "A1". The numbering module 102 further stores the three-dimensional coordinates of outline points of the first accessory "A1" in the server 3 according to the number "A1".

For another example, the numbering module 102 assigns a number "B1" to the outline points of the second accessory "B1", and controls the steering wheel 23 to transport the second accessory "B1" into a cabinet whose number is "B1". The numbering module 102 further stores the three-dimensional coordinates of outline points of the second accessory "B1" in the server 3 according to the number "B1".

The pairing module 103 determines a second accessory to pair with each of the first accessories, according to the three-dimensional coordinates of the outline points of the first accessories and the second accessories.

Figure 8A:
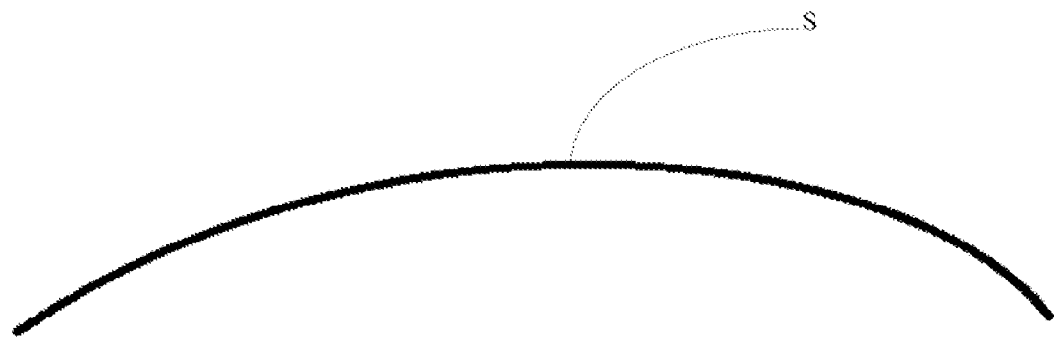
FIG. 8A and FIG. 8B show an example of determining a second accessory to pair with each of the first accessories.

In at least one embodiment, when the pairing module 103 determines the second accessory to pair with each of the first accessories, the paring module 103 fits the three-dimensional coordinates of the outline points of each of the first accessories to be a curve. For example, as shown in FIG. 8A, the pairing module 103 fits the three-dimensional coordinates of the outline points of the first accessory "A1" to be a curve "S".

The pairing module 103 iterates an approximate position of the three-dimensional coordinates of the outline points of each of the second accessories corresponding to the curve using the least square method. In the embodiment, the pairing module 103 iterates the approximate position using a predetermined iterative formula of $$f(X) = \sqrt{\frac{\sum_{n=1}^{n} \left( \sqrt{(X2-X1)^2 + (Y2-Y1)^2 + (Z2-Z1)^2} \right)^2}{n}}.$$

Figure 8B:
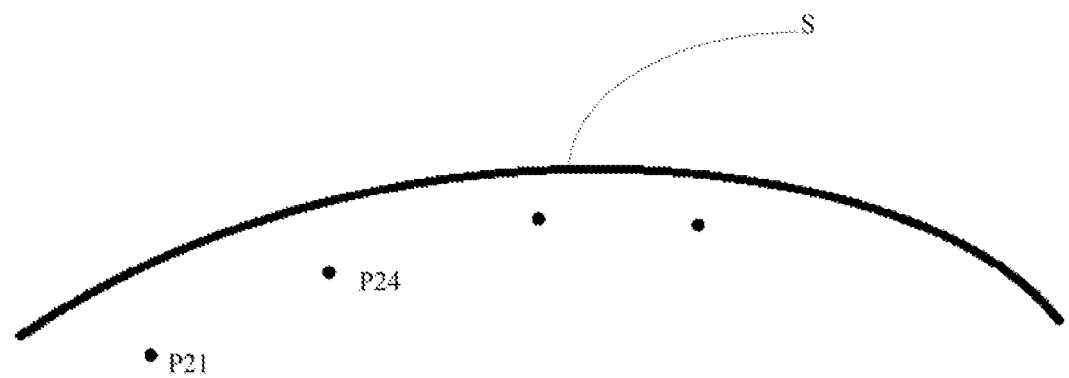

In the predetermined iterative formula, "(X1, Y1, Z1)" represents three-dimensional coordinates of the outline points of each of the first accessories, "(X2, Y2, Z2)" represents three-dimensional coordinates of the outline points of each of the second accessories, and "n" represents a total number of three-dimensional coordinates of outline points of each of the second accessories. For example, the pairing module 103 iterates the approximate position of coordinates P21 and P24 of the second accessory "B1" corresponding to the curve "S" as shown in FIG. 8B.

The pairing module 103 computes distance deviation values between the three-dimensional coordinates of the outline points of each of the second accessories and the curve, and stores the distance deviation values of the three-dimensional coordinates of the outline points of each of the second accessories to corresponding distance deviation arrays. The pairing module 103 further computes standard deviation values of the distance deviation arrays, and stores all the standard deviation values to a standard deviation array.

In at least one embodiment, a distance deviation value can be equal to the minimum distance value between each of the three-dimensional coordinates of the outline points of each of the second accessories and the curve. A standard deviation value is computed using a predetermined formula of $\sqrt{\Sigma(x-\bar{x})^2/(n-1)}$, "x" represents an average value of each of the distance deviation arrays, and "n" represents the total number of the distance deviation values of each of the distance deviation arrays.

For example, the pairing module 103 computes a distance deviation value of the coordinates P21 of the second accessory "B1" to be 0.02 millimeter (mm), and computes a distance deviation value of the coordinates P24 of the second accessory "B1" to be 0.01 mm. The two distance deviation values are stored to a distance deviation array of the second accessory "B1" by the pairing module 103. When all of the distance deviation values between the three-dimensional coordinates of the outline points of the second accessory "B1" and the curve "S" are obtained and stored in the distance deviation array of the second accessory "B1", the pairing module 103 computes a standard deviation value of the distance deviation array of the second accessory "B1", and stores the obtained standard deviation value of the second accessory "B1" to the standard deviation array.

The pairing module 103 determines the second accessory whose standard deviation value is less than a predetermined tolerance (e.g., 0.02 mm) for each first accessory. In one embodiment, if more than one second accessories have the standard deviation value less than the predetermined tolerance in the standard deviation array, a second accessory having a minimum standard deviation value is selected to be the determined second accessory.

The pairing module 103 further generates a first list to record paired first and second accessories according to the numbers of the outline points of the paired first and second accessories, and generates a second list to record unpaired first and second accessories.

The sorting module 104 controls the transport system 200 to transport the paired first and second accessories from corresponding locations into a first box for assembly. The sorting module 104 further controls the transport system 200 to transport the unpaired first and second accessories into a second box.

Figure 6:
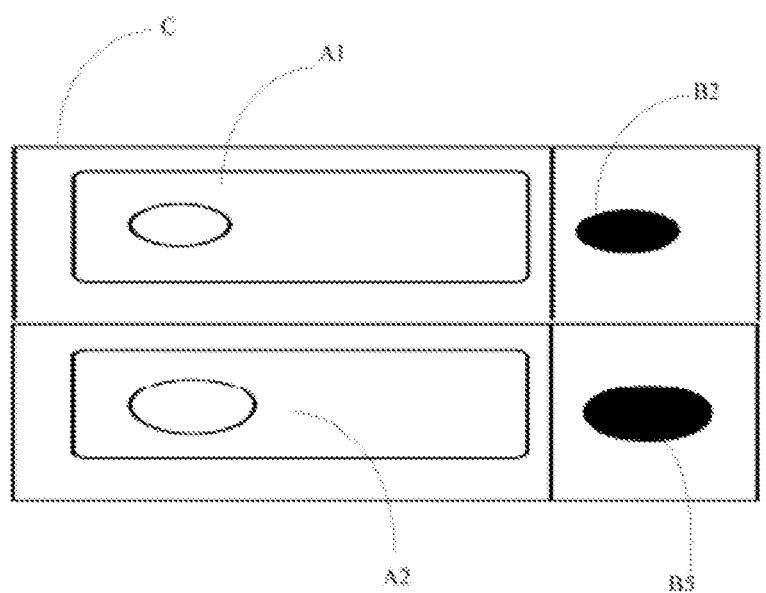
FIG. 6 shows an example of paired first and second accessories.

For example, FIG. 6 illustrates that the sorting module 104 controls the transport system 200 to transport two paired first and second accessories into the first box "C" for assembly. The two paired first and second accessories includes a first pair which includes the first accessory "A1" and a second accessory "B2", and a second pair which includes a first accessory "A2" and a second accessory "B5".

The outputting module 105 displays a report on the display device 11 of the computing device 1 according to the first list and the second list. For example, the report indicates that "First: A total number of the first accessories is 156 pieces (PCS), and the total number of the second accessories is 300 PCS. Second: 120 PCS of the first accessories are successfully paired with the second accessories, and 36 PCS of the first accessories are not paired, when a predetermined tolerance is equal to 0.02 mm."

Figure 4:
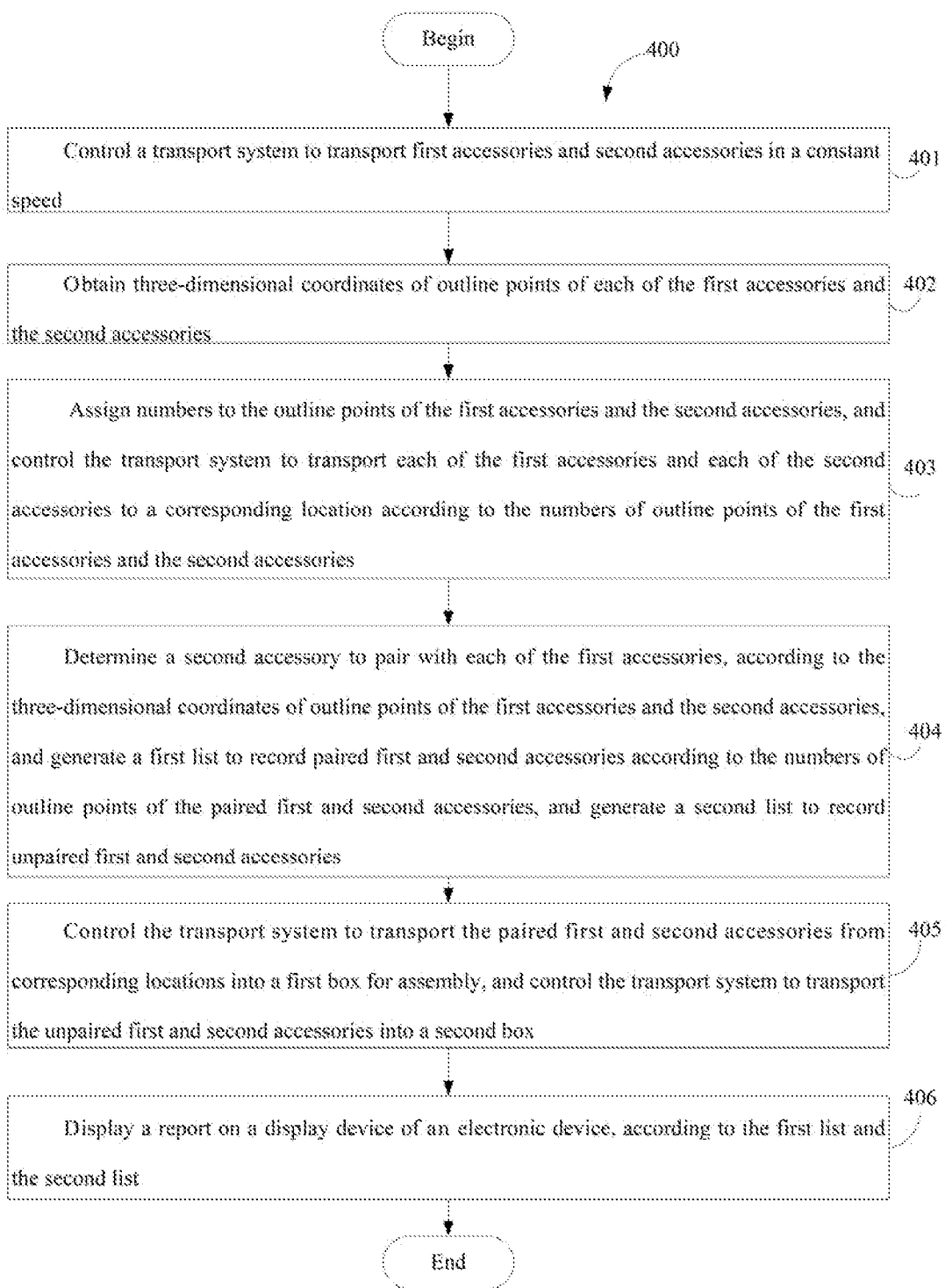
FIG. 4 shows a flow chart of a pairing method in accordance with an embodiment of the present disclosure.

FIG. 4 is a flowchart of an example embodiment of a method for pairing the first and second accessories. In an example embodiment, the method is performed by execution of computer-readable software program codes or instructions by at least one processor 13 of a computing device 1, and can automatically determine a second accessory to pair with each of the first accessories.

FIG. 4 illustrates a flowchart in accordance with an example embodiment. In the embodiment, the example method 400 is provided by way of example only as there are a variety of ways to carry out the method. The method 400 described below can be carried out using the configurations illustrated in FIGS. 1 and 3, for example, and various elements of these figures are referenced in explaining the example method 400. Each block shown in FIG. 4 represents one or more processes, methods or subroutines, carried out in the exemplary method 400. Additionally, the illustrated order of blocks is by example only and the order of the blocks can be changed according to the present disclosure. The exemplary method 400 can begin at block 401.

In block 401, a processing module controls a transport system to transport first accessories and second accessories at a predetermined speed. In at least one embodiment, each of the first accessories and the second accessories are respectively fixed in a holder 21, and is kept parallel to a plane where a transport rail of the transport system is located.

In block 402, the processing module obtains three-dimensional coordinates of outline points of each of the first accessories and the second accessories using a charge coupled device (CCD), when each of the first accessories and the second accessories passes through the CCD.

For example, as shown in FIG. 5, the processing module obtains three-dimensional coordinates P11, P14, P17 of outline points of a first accessory "A1", and obtains three dimensional coordinates P21, P24, P27 of the outline points of a second accessory "B1". Three three-dimensional coordinates are obtained to represent the first accessory "A1" and the second accessory "B1" in the FIG. 5. In other embodiments, a different number of three-dimensional coordinates can be obtained to represent the first accessory "A1" and the second accessory "B1".

In block 403, a numbering module assigns numbers to the outline points of the first accessories and the second accessories, and controls the transport system to transport each of the first accessories and each of the second accessories to a corresponding location according to the numbers of outline points of the first accessories and the second accessories. The three-dimensional coordinates of the outline points of the first accessory and the second accessories are stored in the server 3 by the numbering module 102 according to the number of outline points.

For example, the numbering module assigns a number "A1" to the outline points of a first accessory "A1", and controls a first steering wheel of the transport system to transport the first accessory "A1" into a cabinet whose number is "A1". The numbering module further stores the three-dimensional coordinates of outline points of the first accessory "A1" in a server according to the number "A1".

For another example, the numbering module assigns a number "B1" to the outline points of a second accessory "B1", and controls a second steering wheel of the transport system to transport the second accessory "B1" into a cabinet whose number is "B1". The numbering module further stores the three-dimensional coordinates of outline points of the second accessory "B1" in the server according to the number "B1".

In block 404, a pairing module determines a second accessory to pair with each of the first accessories, according to the three-dimensional coordinates of the outline points of the first accessories and the second accessories. The pairing module further generates a first list to record paired first and second accessories according to the numbers of outline points of the paired first and second accessories, and generates a second list to record unpaired first and second accessories. More details of the block 4 will be provided in FIG. 7.

In block 405, a sorting module controls the transport system to transport the paired first and second accessories from corresponding locations into a first box for assembly. The sorting module further controls the transport system to transport the unpaired first and second accessories into a second box.

For example, FIG. 6 illustrates that the sorting module controls the transport system to transport two paired first and second accessories into the first box "C" for assembly. The two paired first and second accessories includes a first pair which includes the first accessory "A1" and a second accessory "B2", and a second pair which includes a first accessory "A2" and a second accessory "B5".

In block 406, an outputting module displays a report on a display device of the computing device, according to the first list and the second list. For example, the report includes that "First: A total number of the first accessories is 156 pieces (PCS), and the total number of the second accessories is 300 PCS.

Second: 120 PCS of the first accessories are successfully paired with the second accessories, and 36 PCS of the first accessories are not paired, when a predetermined tolerance is equal to 0.02 millimeter (mm)."

Figure 7:
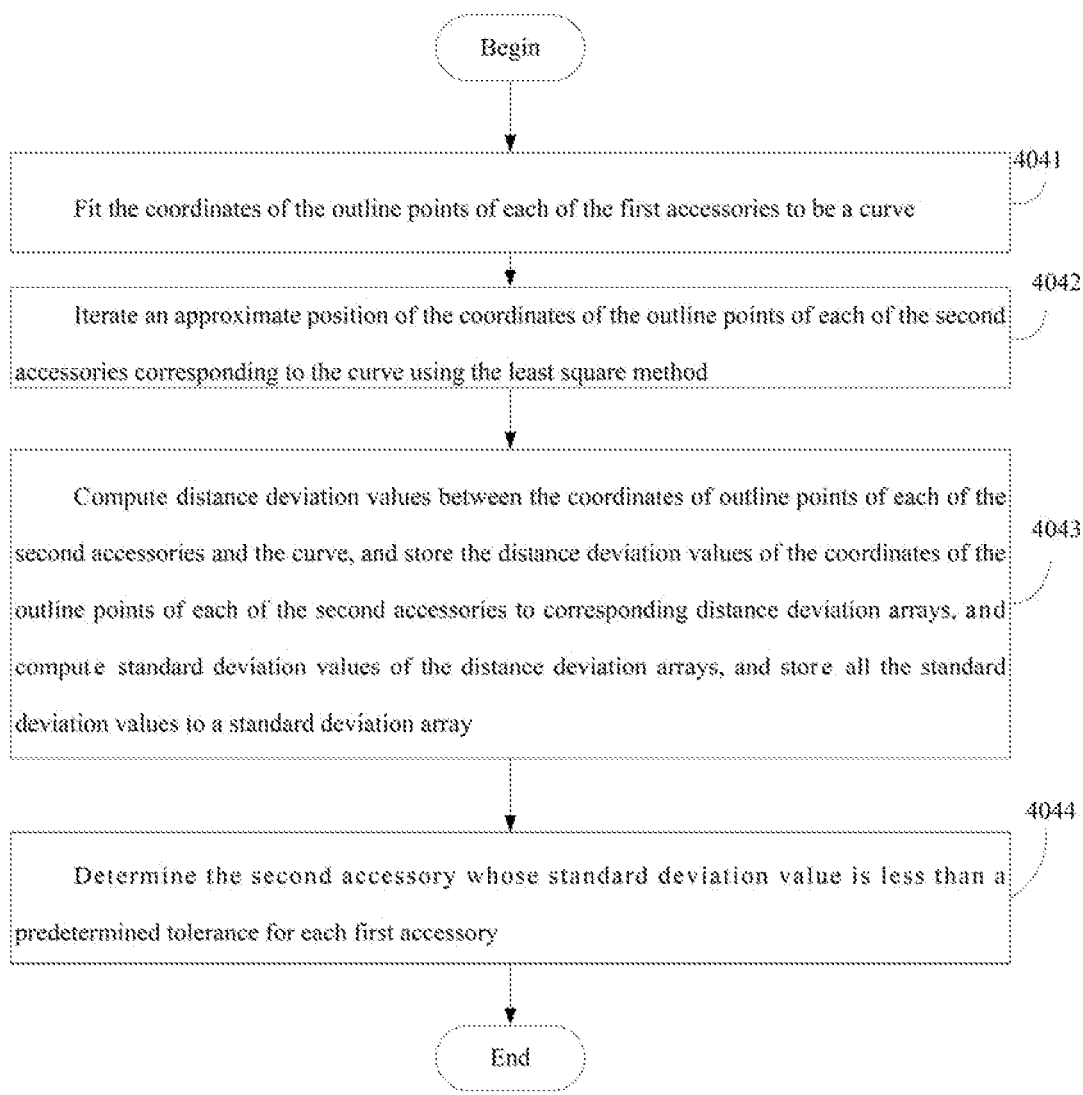
FIG. 7 is a detailed flow chart of block 404 of FIG. 4.

FIG. 7 illustrates a further explanation of the block 404.

In block 4041, the pairing module fits the three-dimensional coordinates of outline points of each of the first accessories to be a curve. For example, as shown in FIG. 8A, the pairing module fits the three-dimensional coordinates of the outline points of the first accessory "A1" to be the curve "S".

In block 4042, the pairing module iterates an approximate position of the three-dimensional coordinates of the outline points of each of the second accessories corresponding to the curve using the least square method. In this embodiment, the pairing module iterates the approximate position using a predetermined iterative formula of $$f(X) = \sqrt{\underset{n=1}{\overset{n}{\sum}} \left(\sqrt{(X2-X1)^2 + (Y2-Y1)^2 + (Z2-Z1)^2}\right)^2 \over n}.$$

In the predetermined iterative formula, "(X1, Y1, Z1)" represents three-dimensional coordinates of the outline points of each of the first accessories, "(X2, Y2, Z2)" represents three-dimensional coordinates of the outline points of each of the second accessories, and "n" represents a total number of three-dimensional coordinates of outline points of each of the second accessories. For example, the pairing module iterates the approximate position of coordinates P21 and P24 of the second accessory "B1" corresponding to the curve "S" (as shown in FIG. 8B).

In block 4043, the pairing module computes distance deviation values between the three-dimensional coordinates of the outline points of each of the second accessories and the curve, and stores the distance deviation values of the three-dimensional coordinates of the outline points of each of the second accessories to corresponding distance deviation arrays. The pairing module computes standard deviation values of the distance deviation arrays, and stores all the standard deviation values to a standard deviation array.

In at least one embodiment, a distance deviation value can be equal to the minimum distance value between each of the three-dimensional coordinates of the outline points of each of the second accessories and the curve. A standard deviation value is computed using a predetermined formula of $\sqrt{\Sigma(x-\bar{x})^2/(n-1)}$, "x" represents an average value of each of the distance deviation arrays, and "n" represents the total number of the distance deviation values of each of the distance deviation arrays.

For example, the pairing module computes a distance deviation value of the coordinates P21 of the second accessory "B1" to be 0.02 millimeter (mm), and computes a distance deviation value of the coordinates P24 of the second accessory "B1" to be 0.01 mm. The pairing module further stores the two distance deviation values to a distance deviation array of the second accessory "B1". When all of the distance deviation values between the three-dimensional coordinates of the outline points of the second accessory "B1" and the curve "S" are obtained and stored in the distance deviation array of the second accessory "B1", the pairing module computes a standard deviation value of the distance deviation array of the second accessory "B1", and stores the obtained standard deviation value of the second accessory "B1" to the standard deviation array.

In block 4044, the pairing module determines the second accessory whose standard deviation value is less than a predetermined tolerance (e.g., 0.02 mm) for each first accessory. In one embodiment, if more than one second accessories have the standard deviation value less than the predetermined tolerance in the standard deviation array, a second accessory having a minimum standard deviation value is selected to be the determined second accessory.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in particular the matters of shape, size and arrangement of parts within the principles of the present disclosure, up to and including the full extent established by the broad general meaning of the terms used in the claims.

What is claimed is:

1. A computing device comprising:
   at least one processor; and
   a storage device storing one or more computer-readable programs comprising instructions, which when executed by the at least one processor, cause the at least one processor to:
   obtain coordinates of outline points of first accessories and second accessories of a product;
   assign numbers to the outline points of the first accessories and the second accessories;
   control a transport system to transport each of the first accessories and each of the second accessories to a corresponding location according to the numbers of the outline points of the first accessories and the second accessories;
   determine a second accessory to pair with each of the first accessories according to the coordinates of the outline points of the first accessories and the second accessories;
   generate a first list to record paired first and second accessories according to the numbers of the outline points of the paired first and second accessories;
   generate a second list to record unpaired first and second accessories;
   transport the paired first and second accessories from corresponding locations into a first box for assembly and transport the unpaired first and second accessories into a second box by controlling the transport system; and
   display a report on a display device of the computing device, according to the first list and the second list.

2. The computing device of claim 1, wherein the coordinates of the outline points of the first accessories and the second accessories are obtained from a charge coupled device (CCD), which is in connection to the computing device.

3. The computing device of claim 1, wherein the second accessory is determined to pair with each of the first accessories by:
   fitting the coordinates of the outline points of each of the first accessories to be a curve;
   iterating an approximate position of the coordinates of the outline points of each of the second accessories corresponding to the curve using the least square method;
   computing distance deviation values between the coordinates of outline points of each of the second accessories and the curve, and storing the distance deviation values of the coordinates of the outline points of each of the second accessories to corresponding distance deviation arrays;
   computing standard deviation values of the distance deviation arrays, and storing all the standard deviation values to a standard deviation array; and
   determining the second accessory whose standard deviation value is less than a predetermined tolerance for each first accessory.

4. The computing device of claim 3, wherein the approximate position is determined using a predetermined iterative formula of $$f(X) = \sqrt{\frac{Min \sum_{n=1}^{n}\left(\sqrt{(X2-X1)^2+(Y2-Y1)^2+(Z2-Z1)^2}\right)^2}{n}},$$

"(X1, Y1, Z1)" representing coordinates of outline points of each of the first accessories, "(X2, Y2, Z2)" representing coordinates of outline points of each of the second accessories, and "n" representing a total number of coordinates of outline points of each of the second accessories.

5. The computing device of claim 3, wherein if more than one second accessories have the standard deviation value less than the predetermined tolerance in the standard deviation array, a second accessory having a minimum standard deviation value is selected to be the determined second accessory.

6. A method for pairing accessories using a computing device, the method comprising:
   obtaining coordinates of outline points of first accessories and second accessories of a product;
   assigning numbers to the outline points of the first accessories and the second accessories;
   control a transport system to transport each of the first accessories and each of the second accessories to a corresponding location according to the numbers of the outline points of the first accessories and the second accessories;
   determining a second accessory to pair with each of the first accessories according to the coordinates of the outline points of the first accessories and the second accessories;
   generate a first list to record paired first and second accessories according to the numbers of the outline points of the paired first and second accessories;
   generate a second list to record unpaired first and second accessories;
   transporting the paired first and second accessories from corresponding locations into a first box for assembly and transport the unpaired first and second accessories into a second box by controlling the transport system; and
   displaying a report on a display device of the computing device, according to the first list and the second list.

7. The method of claim 6, wherein the coordinates of the outline points of the first accessories and the second accessories are obtained from a charge coupled device (CCD), which is in connection to the computing device.

8. The method of claim 6, wherein the second accessory is determined to pair with each of the first accessories by:
   fitting the coordinates of the outline points of each of the first accessories to be a curve;
   iterating an approximate position of the coordinates of the outline points of each of the second accessories corresponding to the curve using the least square method;
   computing distance deviation values between the coordinates of outline points of each of the second accessories and the curve, and storing the distance deviation values of the coordinates of the outline points of each of the second accessories to corresponding distance deviation arrays;
   computing standard deviation values of the distance deviation arrays, and storing all the standard deviation values to a standard deviation array; and
   determining the second accessory whose standard deviation value is less than a predetermined tolerance for each first accessory.

9. The method of claim 8, wherein the approximate position is determined using a predetermined iterative formula of $$f(X) = \sqrt{\frac{Min \sum_{n=1}^{n}\left(\sqrt{(X2-X1)^2+(Y2-Y1)^2+(Z2-Z1)^2}\right)^2}{n}},$$

"(X1, Y1, Z1)" representing coordinates of outline points of each of the first accessories, "(X2, Y2, Z2)" representing coordinates of outline points of each of the second accessories, and "n" representing a total number of coordinates of outline points of each of the second accessories.

10. The method of claim 8, wherein if more than one second accessories have the standard deviation value less than the predetermined tolerance in the standard deviation array, a second accessory having a minimum standard deviation value is selected to be the determined second accessory.

11. A non-transitory storage medium having stored thereon instructions, when executed by at least one processor of a computing device, cause the least one processor to execute instructions of a method for pairing accessories, the method comprising:
   obtaining coordinates of outline points of first accessories and second accessories of a product;
   assigning numbers to the outline points of the first accessories and the second accessories;
   control a transport system to transport each of the first accessories and each of the second accessories to a corresponding location according to the numbers of the outline points of the first accessories and the second accessories;
   determining a second accessory to pair with each of the first accessories according to the coordinates of the outline points of the first accessories and the second accessories;
   generate a first list to record paired first and second accessories according to the numbers of the outline points of the paired first and second accessories;
   generate a second list to record unpaired first and second accessories;
   transporting the paired first and second accessories from corresponding locations into a first box for assembly and transport the unpaired first and second accessories into a second box by controlling the transport system; and
   displaying a report on a display device of the computing device, according to the first list and the second list.

12. The non-transitory storage medium according to claim 11, wherein the coordinates of the outline points of the first accessories and the second accessories are obtained from a charge coupled device (CCD), which is in connection to the computing device.

13. The non-transitory storage medium according to claim 11, wherein the second accessory is determined to pair with each of the first accessories by:
   fitting the coordinates of the outline points of each of the first accessories to be a curve;
   iterating an approximate position of the coordinates of the outline points of each of the second accessories corresponding to the curve using the least square method;
   computing distance deviation values between the coordinates of outline points of each of the second accessories and the curve, and storing the distance deviation values of the coordinates of the outline points of each of the second accessories to corresponding distance deviation arrays;
   computing standard deviation values of the distance deviation arrays, and storing all the standard deviation values to a standard deviation array; and determining the second accessory whose standard deviation value is less than a predetermined tolerance for each first accessory.

14. The non-transitory storage medium according to claim 13, wherein the approximate position is determined using a predetermined iterative formula of $$f(X) = \sqrt{\dfrac{Min\sum_{n=1}^{n}\left(\sqrt{(X2-X1)^2+(Y2-Y1)^2+(Z2-Z1)^2}\right)^2}{n}},$$

"(X1, Y1, Z1)" representing coordinates of outline points of each of the first accessories, "(X2, Y2, Z2)" representing coordinates of outline points of each of the second accessories, and "n" representing a total number of coordinates of outline points of each of the second accessories.

15. The non-transitory storage medium according to claim 13, wherein if more than one second accessories have the standard deviation value less than the predetermined tolerance in the standard deviation array, a second accessory having a minimum standard deviation value is selected to be the determined second accessory.

* * * * *